(12) United States Patent
Bolin et al.

(10) Patent No.: US 8,676,372 B1
(45) Date of Patent: Mar. 18, 2014

(54) TOOL PATH GENERATION FOR MACHINING OPERATIONS

(75) Inventors: Jared Lee Bolin, Millstadt, IL (US); Ryan Lee Hanks, Shipman, IL (US)

(73) Assignee: The Boeing Company, Chicago, IL (US)

( * ) Notice: Subject to any disclaimer, the term of this patent is extended or adjusted under 35 U.S.C. 154(b) by 328 days.

(21) Appl. No.: 13/186,008

(22) Filed: Jul. 19, 2011

(51) Int. Cl.
*G05B 19/19* (2006.01)

(52) U.S. Cl.
USPC .......................................... 700/191; 700/190

(58) Field of Classification Search
None
See application file for complete search history.

(56) References Cited

U.S. PATENT DOCUMENTS

| | | | |
|---|---|---|---|
| 6,701,211 B2 * | 3/2004 | Orczykowski et al. | 700/191 |
| 2003/0040834 A1 * | 2/2003 | Coleman et al. | 700/191 |
| 2005/0256604 A1 * | 11/2005 | Diehi et al. | 700/159 |

OTHER PUBLICATIONS

Altintas et al., "Analytical Prediction of Stability Lobes in Milling", Annals of the CIRP vol. 44, 1995, pp. 357-362.
Tekeli et al., "Maximization of Chatter-Free Material Removal Rate in End Milling Using Analytical Methods", 2005, Machining Science and Technology, 9: pp. 147-167.

* cited by examiner

*Primary Examiner* — Ryan Jarrett
(74) *Attorney, Agent, or Firm* — Yee & Associates, P.C.

(57) ABSTRACT

A method and apparatus for managing machining. A desired level of engagement of a tool may be identified with a workpiece. A tool path for the tool may be generated relative to the workpiece. The tool path may have a number of levels of engagement of the tool with the workpiece along the tool path. The number of levels of engagement of the tool with the workpiece along the tool path may be based on the desired level of engagement.

33 Claims, 12 Drawing Sheets

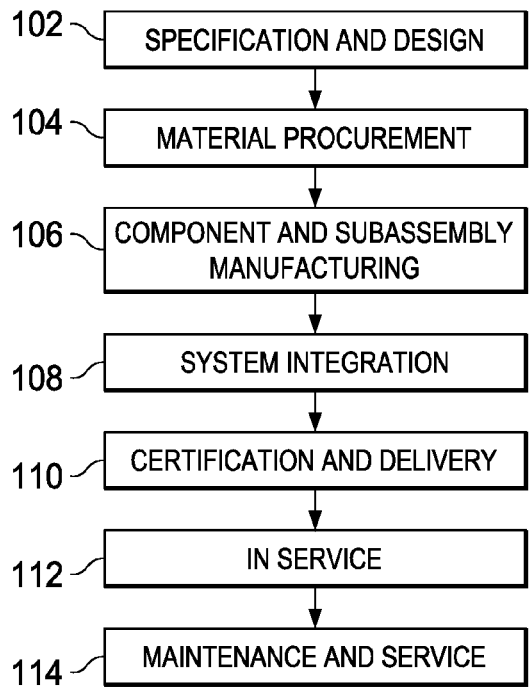
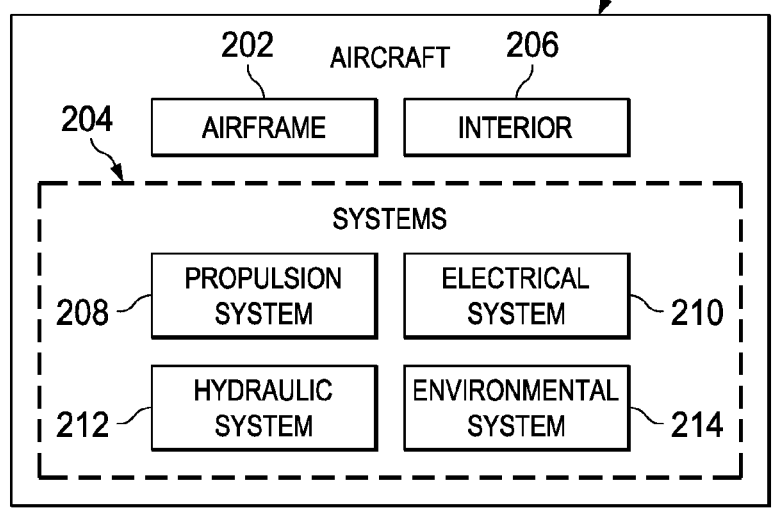

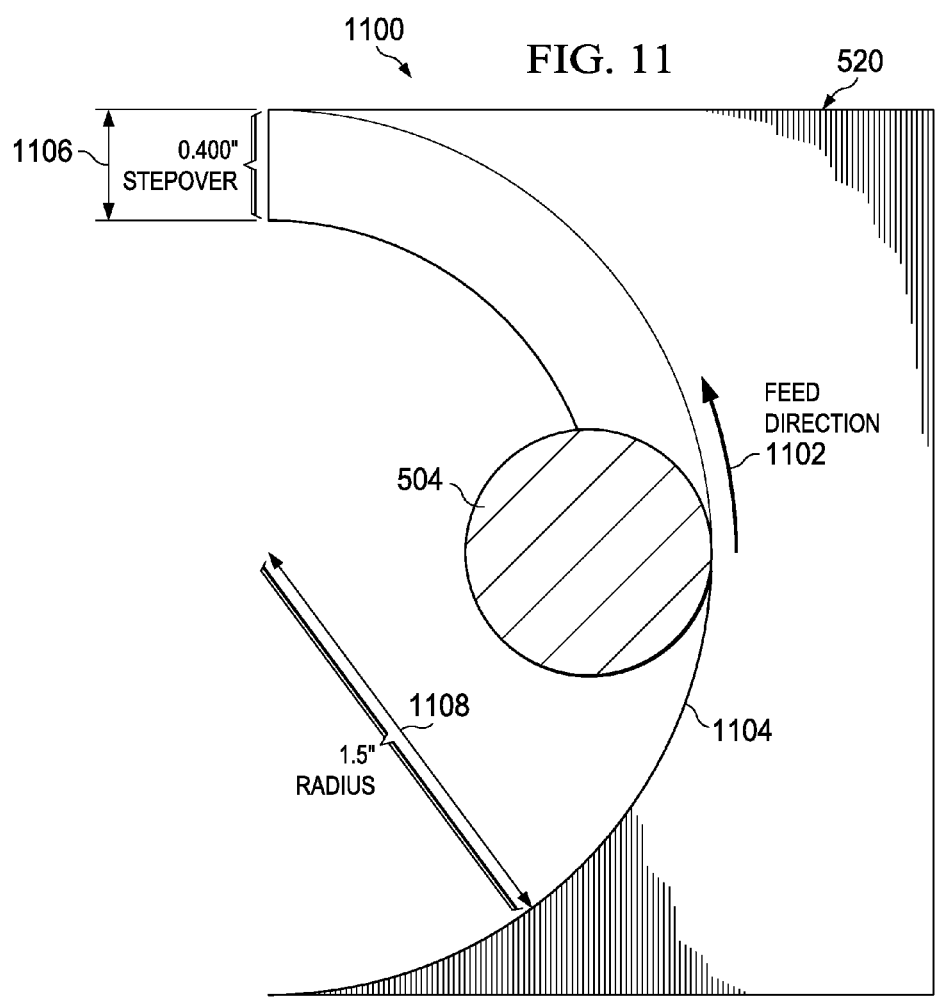

| | DESCRIPTION | MATERIAL CODE | TOOL EXTENSION | SET LENGTH | HOLDER | PARAMETERS |
|---|---|---|---|---|---|---|
| | | 1404 | 1406 | 1408 | 1410 | 1412 |
| 3/4" 0.7500 | END MILL: (.75 x 4.5 x .010) | T7564501 | 4.785 | 7.66 | MARQUART 04701627073 | 14,400 RPM 216 IPM MaxADOC=.028 |
| 1402 | | | | | | 1414 |
| | | | | | | |
| | | | | | | |

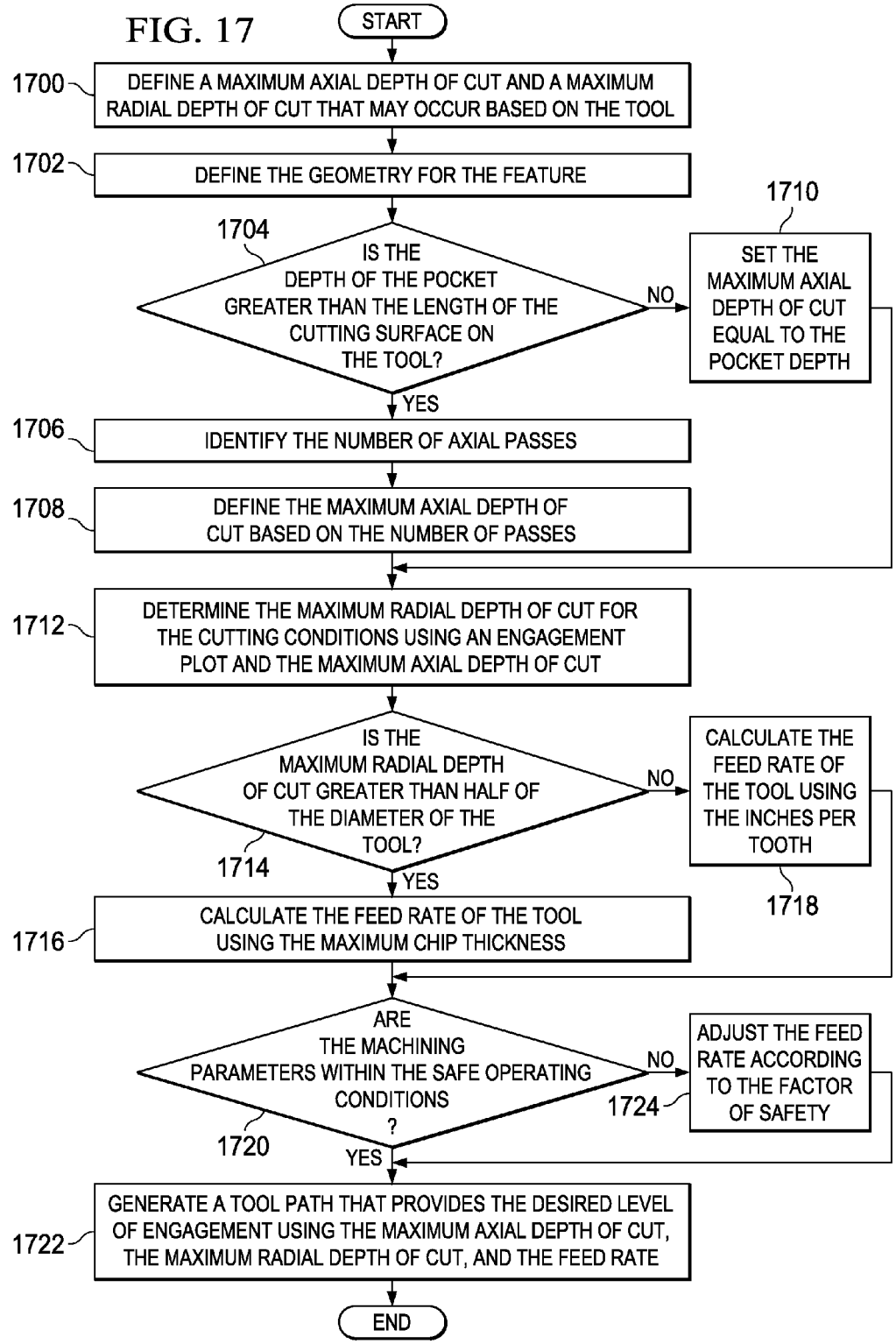

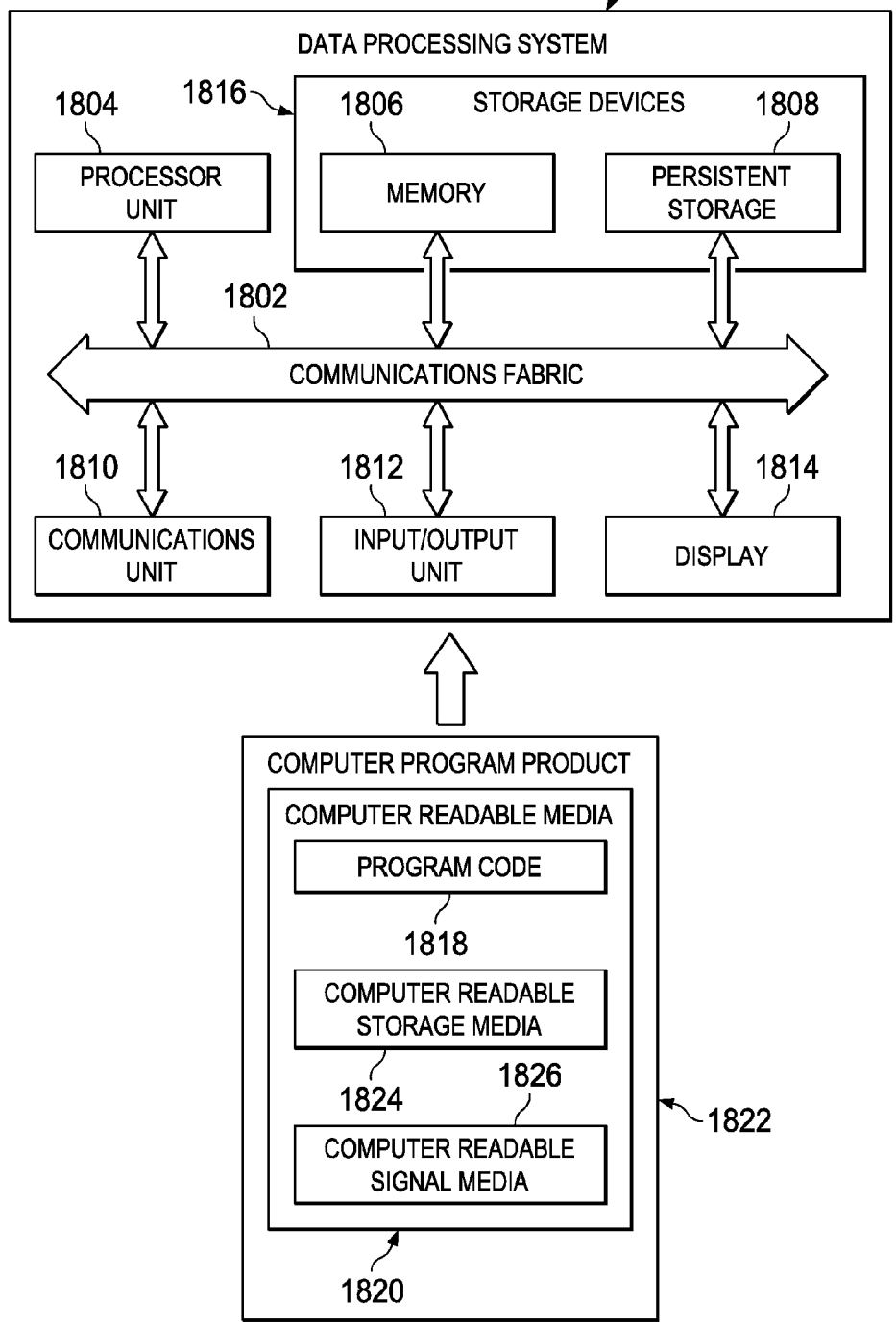

TOOL PATH GENERATION FOR MACHINING OPERATIONS

BACKGROUND INFORMATION

1. Field

The present disclosure relates generally to manufacturing and, in particular, to manufacturing parts. Still more particularly, the present disclosure relates to a method and apparatus for generating tool paths for machining operations.

2. Background

Machining may be a process in which a cutting tool may be used to mechanically remove material from a workpiece. Machining may be used to form parts from blocks of materials. Machining may include, for example, without limitation, boring, drilling, milling, reaming, grinding, and other suitable types of processes. Machining may be performed using machines that are computer controlled. This type of machining may be referred to as computer numerical control (CNC) machining.

In machining workpieces to form parts, it may be desirable to form the parts as quickly as possible. If more parts may be created from machining during a particular period of time, more parts may be generated for use or delivery to customers.

With computer numerical control machines, programs may be used to control the machining operations. These programs may include paths along which the tool travels to form a part. These paths may also be referred to as tool paths. The speed at which a tool may be moved over a tool path may depend on the speed at which the tool may be rotated, the dimensions of the tool, the type of material to be machined, and other suitable factors. The more material that may be removed when the tool moves along a path relative to the workpiece may decrease the amount of time needed to form the part.

However, inconsistencies may be generated when machining occurs more quickly. These inconsistencies may include, for example, without limitation, an undesired finish on the surface, waviness, and/or other inconsistencies that may lead to out-of-tolerance conditions.

These types of inconsistencies may be caused by vibrations occurring during machining. These types of vibrations also may be referred to as chatter. These vibrations may be avoided by securing the workpiece, selecting a tool that may result in smaller vibrations, changing the speed at which machining operations are performed, and other suitable parameters.

These types of adjustments may reduce inconsistencies on the workpiece. The adjustments to different parameters with respect to the tool and the machine on which the tool is used, may result in longer times than desired for performing machining operations. Increased time to perform machining operations may reduce the rate at which workpieces may be processed to form a part.

Therefore, it would advantageous to have a method and apparatus that takes into account at least some of the issues discussed above, as well as possibly other issues.

SUMMARY

In one advantageous embodiment, a computer-implemented method for managing machining operations may be provided. A desired level of engagement of a tool may be identified with a workpiece. A tool path for the tool may be generated relative to the workpiece. The tool path may have a number of levels of engagement of the tool with the workpiece along the tool path. The number of levels of engagement of the tool with the workpiece along the tool path may be based on the desired level of engagement.

In another advantageous embodiment, a method for machining an aircraft part from a workpiece may be provided. A desired level of engagement of a tool may be identified with a workpiece when the tool is used on a particular machine to perform machining operations on the workpiece using an engagement plot of an axial depth of cut versus a radial depth of cut for a selected speed of rotation for the tool on the machine. The workpiece may be comprised of a material selected from aluminum, titanium, steel, plastic, and wood. A tool path for the tool may be generated relative to the workpiece. The tool path has a number of levels of engagement of the tool with the workpiece along the tool path. The number of levels of engagement of the tool with the workpiece along the tool path may be based on the desired level of engagement. The desired level of engagement may be defined by the engagement plot showing stability between the axial depth of cut and the radial depth of cut for the tool used with the particular machine at the selected speed of rotation for the tool. A level of engagement in the number of levels of engagement may be selected from at least one of the axial depth of cut and the radial depth of cut for the selected speed of rotation. A feed rate may be selected for the tool. The machining operations may be performed on the workpiece using the feed rate for the tool and the tool path. Operating the tool using the tool path with the number of levels of engagement reducing a number of inconsistencies that are out-of-tolerance on a surface of the workpiece to a desired number of inconsistencies that are out-of-tolerance after the machining operations are completed.

In yet another advantageous embodiment, a method for performing machining operations may be provided. A tool path may be selected for forming a part from a workpiece. The machining operations may be performed on the workpiece using a tool. The tool may move on the tool path for the tool relative to the workpiece with a number of levels of engagement of the tool with the workpiece along the tool path. The number of levels of engagement of the tool with the workpiece along the tool path may be based on the desired level of engagement.

In yet another advantageous embodiment, an apparatus may comprise a computer system. The computer system may be configured to identify a desired level of engagement of a tool with a workpiece. The computer system may be further configured to generate a tool path for the tool relative to the workpiece. The tool path may have a number of levels of engagement of the tool with the workpiece along the tool path. The number of levels of engagement of the tool with the workpiece along the tool path may be based on the desired level of engagement.

In yet another advantageous embodiment, an apparatus may comprise a machine and a tool connected to the machine. The machine may be configured to perform machining operations on a workpiece using a tool. The tool may move on a tool path for the tool relative to the workpiece with a number of levels of engagement of the tool with the workpiece along the tool path. The number of levels of engagement of the tool with the workpiece along the tool path may be based on a desired level of engagement.

In yet another advantageous embodiment, a system for machining an aircraft part from a workpiece may be provided. A computer system may be configured to identify a desired level of engagement of a tool with a workpiece when the tool is used on a particular machine to perform machining operations on the workpiece using an engagement plot of an axial depth of cut versus a radial depth of cut for a selected speed of rotation for the tool on the machine. The workpiece may be comprised of a material selected from aluminum, titanium, steel, plastic, and wood. The computer system may be further configured to generate a tool path for the tool relative to the workpiece. The tool path may have a number of levels of engagement of the tool with the workpiece along the tool path. The number of levels of engagement of the tool with the workpiece along the tool path may be based on the desired level of engagement. The desired level of engagement may be defined by an engagement plot showing stability between an axial depth of cut and a radial depth of cut for the tool used, with the particular machine at a selected speed of rotation for the tool. A level of engagement in the number of levels of engagement may be selected from at least one of the axial depth of cut and the radial depth of cut for the selected speed of rotation. The computer system may be further configured to select a feed rate for the tool. A machine with the tool may be configured to perform the machining operations on the workpiece with the tool using the feed rate for the tool and the tool path. Operating the tool using the tool path with the number of levels of engagement reduces a number of inconsistencies that are out-of-tolerance on a surface of the workpiece to a desired number of inconsistencies that are out-of-tolerance after the machining operations are completed.

The features, functions, and advantages may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 1 is an illustration of an aircraft manufacturing and service method in accordance with an advantageous embodiment;

FIG. 2 is an illustration of an aircraft in which an advantageous embodiment may be implemented;

FIG. 11 is an illustration of radial engagement by a tool in accordance with an advantageous embodiment;

FIG. 17 is an illustration of a flowchart of a process for generating a tool path in accordance with an advantageous embodiment; and FIG. 18 is an illustration of a data processing system in accordance with an advantageous embodiment.

DETAILED DESCRIPTION

Figure 3:
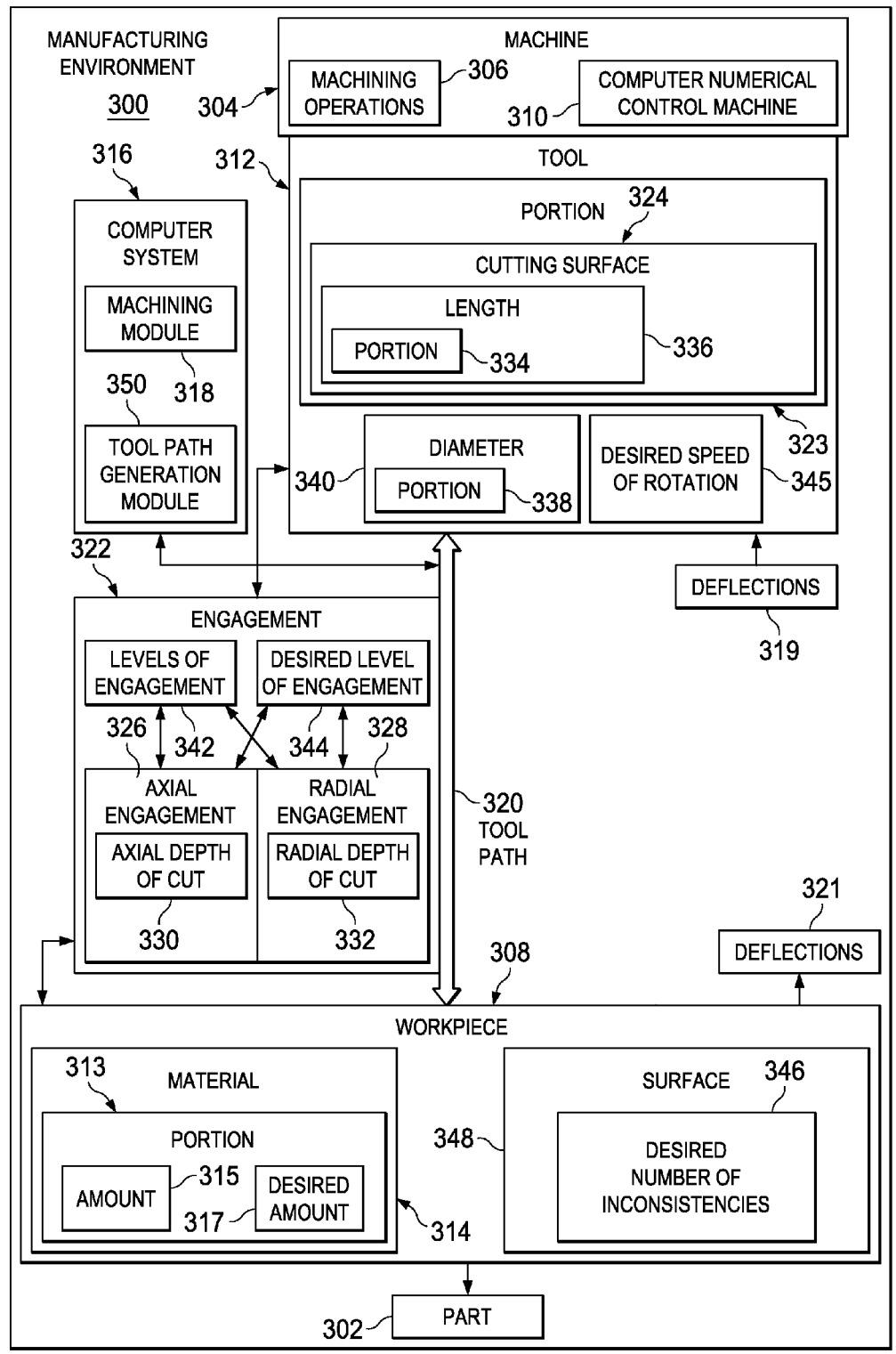
FIG. 3 is an illustration of a manufacturing environment in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. "A number", when referring to items, means one or more items. For example, without limitation, "a number of apparatus embodiments" is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

As one illustrative example, a number of the different advantageous embodiments may be used to increase the speed at which parts may be manufactured for aircraft 200. One or more of the different advantageous embodiments may be used to perform machining operations on an object to form a part. In particular, an advantageous embodiment may be used to increase efficiency in machining objects to form parts for aircraft 200.

The different advantageous embodiments recognize and take into account a number of features. For example, without limitation, the different advantageous embodiments recognize and take into account that selecting a tool path based on the machine used to perform machining may increase the speed at which machining operations occur. This increased speed in performing machining operations may be performed, while reducing undesired features resulting from the machining operations.

The different advantageous embodiments recognize and take into account that currently-used processes for generating tool paths may not control parameters, such as the radial depth at which a tool may remove material from an object.

The different advantageous embodiments recognize and take into account that controlling the radial depth at which the tool cuts during movement of the tool along a tool path may be used to increase the speed at which machining operations may be performed. The different advantageous embodiments also recognize and take into account that the axial depth at which a tool cuts during movement of the tool along the tool path also may be used to increase the speed at which machining operations may be performed. The radial depth and the axial depth at which a tool cuts may be the engagement of the tool.

In other words, the different advantageous embodiments recognize and take into account that the tool paths may be generated to take into account the engagement that is present during different portions of the path. This increase in speed of performing machining operations may be performed in a manner that reduces undesired features from occurring on the object.

With reference now to FIG. 3, an illustration of a manufacturing environment is depicted in accordance with an advantageous embodiment. As depicted, manufacturing environment 300 may be used to manufacture part 302. In particular, machine 304 may produce part 302 by performing machining operations 306 on workpiece 308.

In these illustrative examples, machine 304 may be computer numerical control machine 310. Computer numerical control machine 310 may perform machining operations 306 without need for intervention by a human operator.

In these illustrative examples, machine 304 may be, for example, without limitation, a lathe, a milling machine, or some other suitable type of machine. Workpiece 308 may be an object on which machining operations 306 are performed. Workpiece 308 may be, for example, without limitation, a block of material 314 or some other shape of material 314.

Material 314 comprising workpiece 308 may be, for example, without limitation, aluminum, titanium, steel, plastic, wood, and other suitable types of materials. In these illustrative examples, tool 312 may be rotated and moved with respect to workpiece 308 in a manner that removes portion 313 of material 314 from workpiece 308 to machine part 302. In these illustrative examples, this machining may comprise rough machining operations.

Machining operations 306 that remove portion 313 of material 314 may cause deflections of tool 312 and/or workpiece 308. Rough machining operations may be performed to remove amount 315 of material 314 from workpiece 308 such that workpiece 308 may have a shape for part 302 with desired amount 317 of material 314 left on workpiece 308. In particular, desired amount 317 of material 314 may be selected such that finishing machining operations 306 to remove desired amount 317 of material 314 from workpiece 308 to form part 302 may cause deflections 319 of tool 312 and deflections 321 of workpiece 308 during machining. Deflections 319 and deflections 321 may be within desired tolerances.

As depicted, computer system 316 may control machine 304 in performing machining operations 306. Computer system 316 may be one or more computers. If more than one computer is present in computer system 316, the computers may be in communication with each other.

In these illustrative examples, computer system 316 may be located in machine 304 when machine 304 takes the form of computer numerical control machine 310. In yet other illustrative examples, computer system 316 may be in communication with machine 304 to control the operation of machine 304 in performing machining operations 306.

Machining module 318 may be located in computer system 316. Machining module 318 may be software, hardwire, or a combination of the two. Machining module 318 controls machine 304 in performing machining operations 306 on workpiece 308. Tool path 320 may be a path that tool 312 moves along in performing machining operations 306. Tool path 320 may be a path relative to workpiece 308 to remove material 314 from workpiece 308 in forming part 302.

In these illustrative examples, engagement 322 of tool 312 with workpiece 308 may be controlled. In particular, engagement 322 of tool 312 with workpiece 308 may be controlled along tool path 320 by machining module 318.

In these illustrative examples, engagement 322 of tool 312 may be defined by portion 323 of tool 312 that has cutting surface 324 that contacts workpiece 308 to remove material 314 from workpiece 308. In these illustrative examples, engagement 322 may be described in terms of axial engagement 326 and radial engagement 328.

Axial engagement 326 may be portion 334 of length 336 of tool 312 that has cutting surface 324 that engages workpiece 308. In other words, axial engagement 326 may be measured as axial depth of cut 330. Axial depth of cut 330 may be an axial depth of cut for tool 312.

Further, radial engagement 328 may be measured as portion 338 of diameter 340 of tool 312 that engages workpiece 308 in these depicted examples. In other words, radial engagement 328 may be measured as radial depth of cut 332. Radial depth of cut 332 may be a radial depth of cut for tool 312.

As depicted, engagement 322 may be a number of levels of engagement 342 for axial engagement 326 and/or radial engagement 328. Levels of engagement 342 may be based on desired level of engagement 344 for axial engagement 326 and/or radial engagement 328.

As one illustrative example, desired level of engagement 344 may be a substantially constant radial depth of cut 332. Further, the number of levels of engagement 342 may be a number of axial passes at a desired axial depth of cut 330. An axial pass may also be referred to as a level or cut level.

In this illustrative example, the desired axial depth of cut 330 may be a maximum axial depth of cut 330 selected for speed of rotation 345 selected for tool 312. Desired level of engagement 344 and levels of engagement 342 may be selected such that operation of tool 312 using tool path 320 substantially maintains the substantially constant radial depth of cut 332 that is desired for each axial pass at the desired axial depth of cut 330.

In these illustrative examples, desired level of engagement 344 may be less than all of length 336 and diameter 340 of tool 312 engaging workpiece 308. Desired level of engagement 344 may be based on tool 312 in machine 304 performing machining operations 306 in a manner that reduces any inconsistencies to desired number of inconsistencies 346 on surface 348 of workpiece 308 in forming part 302.

In particular, operating tool 312 using tool path 320 with levels of engagement 342 may reduce the number of inconsistencies that are out-of-tolerance on surface 348 of workpiece 308 to desired number of inconsistencies 346 that are out-of tolerance. In one illustrative example, desired number of inconsistencies 346 that are out-of-tolerance may be zero inconsistencies that are out-of tolerance.

In these illustrative examples, an inconsistency that is out-of-tolerance may be an inconsistency that does not meet desired requirements. For example, without limitation, an out-of-tolerance inconsistency may be a ridge on surface 348 of workpiece 308 that has a height greater than desired.

For example, without limitation, desired level of engagement 344 may be portion 334 of length 336 of cutting surface 324 of tool 312. In these illustrative examples, portion 334 may be all or some of length 336. Desired level of engagement 344 may be portion 338 of diameter 340 of tool 312. Portion 338 may be some or all of diameter 340. In these illustrative examples, desired level of engagement 344 may be a combination of both length 336 and diameter 340. For example, without limitation, as diameter 340 increases, length 336 may decrease, or vice versa.

In some illustrative examples, desired level of engagement 344 may mean that portion 334 of length 336 of cutting surface 324 on tool 312 that engages workpiece 308 may be fixed, while portion 338 of diameter 340 that engages workpiece 308 may vary. In other illustrative examples, portion 338 of diameter 340 may be fixed, while portion 334 of length 336 of tool 312 having cutting surface 324 may vary.

In these illustrative examples, tool path generation module 350 may generate tool path 320. Tool path generation module 350 may generate tool path 320 in a manner such that the number of levels of engagement 342 may be present along tool path 320 during the performance of machining operations 306 on workpiece 308.

Tool path generation module 350 may generate tool path 320 based on tool 312 and machine 304. In other words, tool path 320 may be tailored specifically for machine 304 using tool 312 to perform machining operations 306. In other words, if a different tool is used in place of tool 312 and/or a different machine is used in place of machine 304, tool path 320 may be different and/or engagement 322 along tool path 320 may have a different number of levels of engagement 342 based on a different desired level of engagement 344.

By controlling engagement 322 of tool 312 to workpiece 308 on tool path 320, machining operations 306 may be performed on workpiece 308 more efficiently, as compared to currently-used techniques, while reducing any inconsistencies on surface 348 of workpiece 308 to desired number of inconsistencies 346.

The illustration of manufacturing environment 300 in FIG. 3 is not meant to imply physical or architectural limitations to the manner in which an advantageous embodiment may be implemented. Other components in addition to and/or in place of the ones illustrated may be used. Some components may be excluded. Also, the blocks are presented to illustrate some functional components. One or more of these blocks may be combined and/or divided into different blocks when implemented in an advantageous embodiment.

For example, without limitation, machine 304 may have a number of additional tools in addition to tool 312 that may perform machining operations 306 on workpiece 308 at substantially the same time. In other illustrative examples, machine 304 also may have a number of additional tools in addition to tool 312 for use in performing machining operations 306 on other workpieces.

In still other illustrative examples, workpiece 308 may be a partially machined object on which machining operations 306 are performed.

Figure 4:
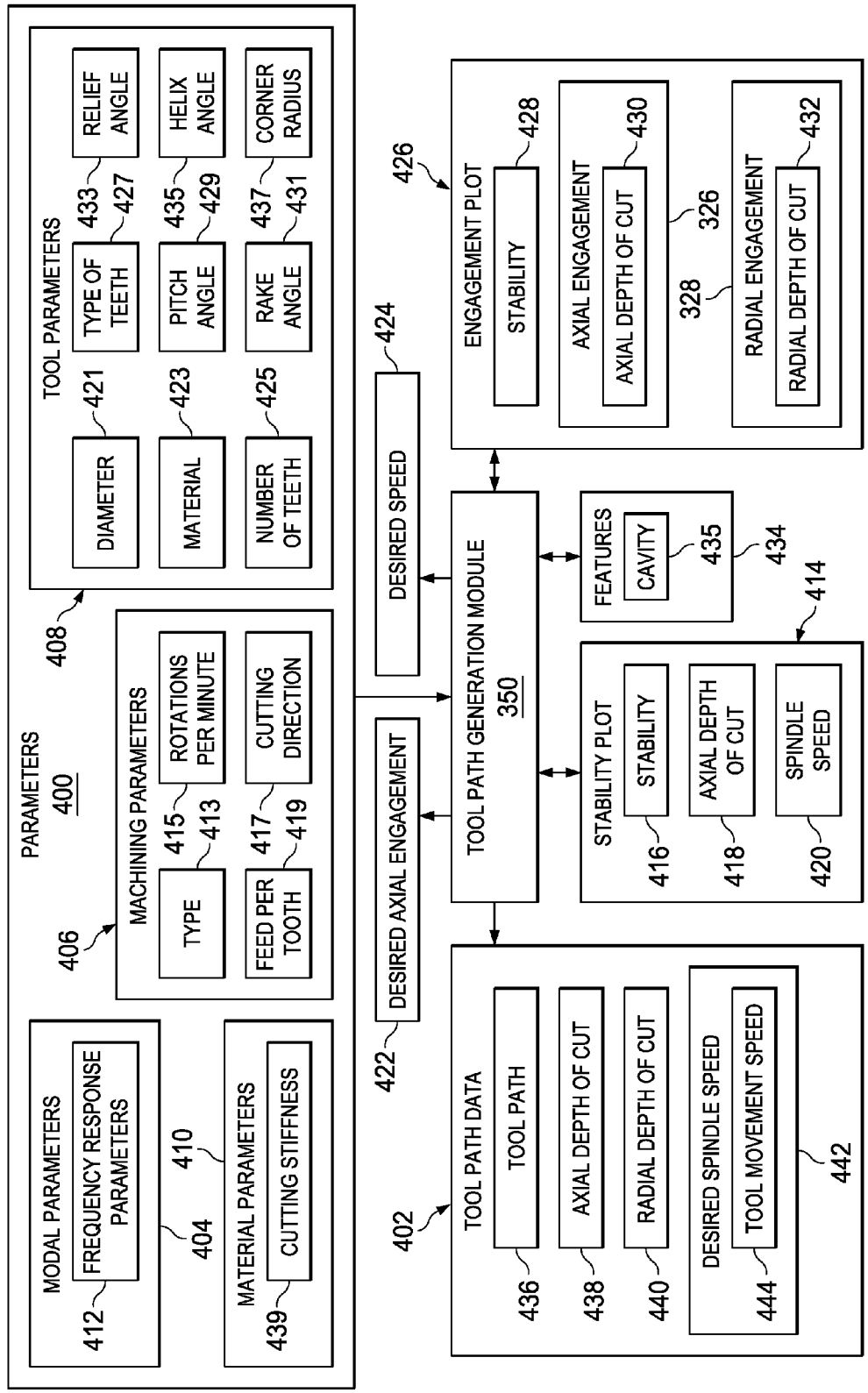
FIG. 4 is an illustration of a block diagram depicting the generation of a tool path in accordance with an advantageous embodiment.

With reference now to FIG. 4, an illustration of a block diagram depicting the generation of a tool path is depicted in accordance with an advantageous embodiment. In these illustrative examples, tool path generation module 350 may identify parameters 400 for use in generating tool path data 402 for tool path 320 in FIG. 3. In these illustrative examples, tool path data 402 may be used by machining module 318 to perform machining operations 306 on workpiece 308 in FIG. 3.

Parameters 400 may comprise, for example, without limitation, modal parameters 404, machining parameters 406, tool parameters 408, material parameters 410, and/or other suitable types of parameters for use in generating tool path data 402. These different parameters may be received by tool path generation module 350 in files, as user input, or in other suitable forms.

Modal parameters 404 may be a description of dynamic properties for machine 304 with tool 312 in FIG. 3. In this illustrative example, modal parameters 404 may be frequency response parameters 412. Machining parameters 406 that may comprise type 413 of material 314 in FIG. 3 to be machined include rotations per minute 415 of tool 312, cutting direction 417, feed per tooth 419, and/or other suitable parameters. Cutting direction 417 may be the direction in which tool 312 cuts. Feed per tooth 419 may be the number of inches per tooth traveled.

Tool parameters 408 may comprise, for example, without limitation, diameter 421 of tool 312, length 336 of cutting surface 324 of tool 312 in FIG. 3, material 423 comprising tool 312, number of teeth 425, type of teeth 427, pitch angle 429 between teeth, rake angle 431 of the cutting teeth, relief angle 433 of the cutting teeth, helix angle 435 of tool 312, corner radius 437 of the cutting teeth, and/or other suitable parameters for tool 312.

Pitch angle 429 may be the angle or number of degrees between the teeth. When number of teeth 425 may be three teeth for tool 312, pitch angle 429 may be about 120 degrees.

Rake angle 431 may be the shear angle between workpiece 308 and the cutting edge of the tooth. When rake angle 431 may be about zero degrees, the cutting edge may be substantially perpendicular to workpiece 308.

Relief angle 433 may be the relief behind the cutting edge. This angle may typically be an angle ground behind a cutting edge so that the cutting edge does not rub workpiece 308 when tool 312 is moved along workpiece 308. Helix angle 435 may be the shear angle along the cutting teeth. When helix angle 435 may be greater than about zero degrees, the cutting tooth may enter the workpiece gradually while creating a z-component cutting force. Corner radius 437 may be the radius on a corner of tool 312 in the form of a square shoulder end-mill.

Material parameters 410 may comprise a type of material for workpiece 308 and other suitable information. For example, without limitation, material parameters 410 may include cutting stiffness 439 and/or other suitable parameters. Cutting stiffness 439 may be the stiffness of material 314 during cutting in the axial and/or radial direction.

With parameters 400, tool path generation module 350 may generate stability plot 414. In these illustrative examples, stability plot 414 may provide information about stability 416 for axial depth of cut 418 that may be performed using tool 312 as a function of spindle speed 420 for machine 304.

In particular, stability plot 414 may be generated using machining dynamics software running in tool path generation module 350 and/or remote to tool path generation module 350. This machining dynamics software may include, for example, without limitation, MetalMAX™ provided by Manufacturing Laboratories, Incorporated; CutPro provided by Manufacturing Automation Laboratories, Incorporated; and/or other suitable types of software programs.

In these illustrative examples, stability 416 may be present when undesired conditions, such as undesired vibrations, undesired surface finishes, and other undesired conditions, may be reduced. With stability plot 414, desired axial engagement 422 may be identified by tool path generation module 350. In some illustrative examples, the identification of desired axial engagement 422 from stability plot 414 may be performed by a human operator.

Desired axial engagement 422 may be selected for desired speed 424. Desired speed 424 may be a speed of rotation for tool 312 in FIG. 3. Desired speed 424 may be an optimal speed. In other words, desired speed 424 may be a fastest speed that may allow for desired axial engagement 422. Further, desired speed 424 may be a speed that allows for an output quality for part 302 within desired tolerances.

With the identification of desired speed 424 using stability plot 414, engagement plot 426 may be generated. Engagement plot 426 may indicate stability 428 for axial engagement 326 as a function of radial engagement 328 in FIG. 3. These types of engagement are described as axial depth of cut 430 and radial depth of cut 432.

Thereafter, features 434 may be identified. Features 434 are features that may be formed on workpiece 308 in FIG. 3 through machining. Features 434 may be identified by selecting a solid model for workpiece 308, selecting a solid model for part 302, and identifying which features need to be machined on workpiece 308 to form part 302 based on these solid models. The solid models may be, for example, without limitation, solid computer-aided design (CAD) models.

An example of a feature in features 434 may be cavity 435. Cavity 435 may be formed in workpiece 308 by removing material 314 from workpiece 308. Cavity 435 may also be referred to as a pocket in these illustrative examples. In these illustrative examples, features 434 may include, for example, without limitation, boundaries for cavity 435, a top of a plane for cavity 435, a base plane for cavity 435, a shape for cavity 435, a corner leftover from forming cavity 435, and other suitable types of features.

Tool path generation module 350 may generate tool path data 402 using engagement plot 426, features 434, and tool parameters 408. As depicted, tool path data 402 may comprise tool path 436, axial depth of cut 438, radial depth of cut 440, desired spindle speed 442, and tool movement speed 444.

In this illustrative example, tool path 436 may be information identifying movement of tool 312 needed to move tool 312 along tool path 320 with respect to workpiece 308 in FIG. 3. Axial depth of cut 438 and/or radial depth of cut 440 may define desired level of engagement 344 in FIG. 3. Desired spindle speed 442 may be the spindle speed at which machining should be performed. Tool movement speed 444 may identify the speed at which the tool moves along tool path 320.

Tool path data 402 may then be used by machine 304 in FIG. 3 to perform machining operations 306 on workpiece 308 to form part 302.

The illustration of the generation of tool path data 402 by tool path generation module 350 in FIG. 4 is not meant to imply limitations to the manner in which an advantageous embodiment may be implemented. Other components in addition to and/or in place of the ones illustrated may be used. Some components may be excluded. Also, the blocks are presented to illustrate some functional components. One or more of these blocks may be combined and/or divided into different blocks when implemented in an advantageous embodiment.

For example, without limitation, stability plot 414 may define stability 416 for a radial depth of cut rather than axial depth of cut 418 as a function of spindle speed 420. In still other illustrative examples, other parameters may be used in addition to and/or in place of modal parameters 404.

Figure 5:
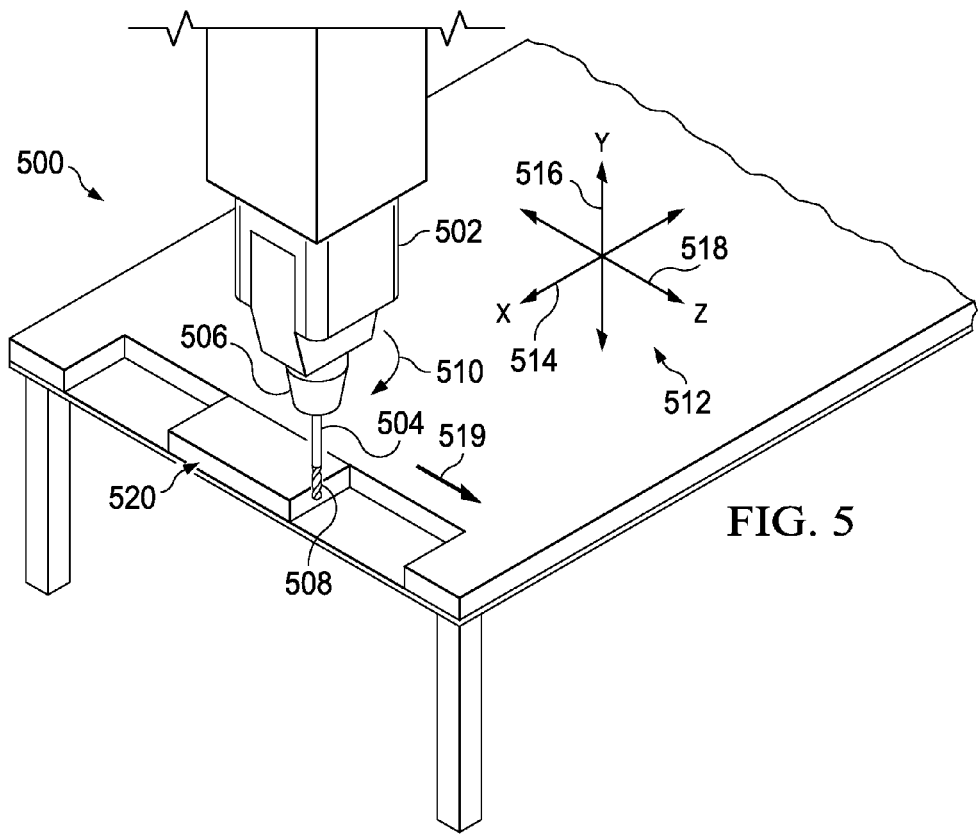
FIG. 5 is an illustration of a setup of a machine with a tool for machining a workpiece in accordance with an advantageous embodiment.

With reference now to FIG. 5, an illustration of a setup of a machine with a tool for machining a workpiece is depicted in accordance with an advantageous embodiment. In this illustrative example, machine 500 may be an example of a physical implementation for machine 304 as shown in block form in FIG. 3. As depicted, machine 500 may take the form of milling machine 502. Tool 504 is an example of a physical implementation of tool 312 shown in block form in FIG. 3. As depicted, tool 504 may be connected to spindle 506 on milling machine 502.

Tool 504 may be cutter 508 and may rotate in the direction of arrow 510. Further, spindle 506 on milling machine 502 may be moved along axes 512. In this illustrative example, axes 512 include X axis 514, Y axis 516, and Z axis 518.

In this illustrative example, tool 504 may be moved about one or more of axes 512 along path 519 relative to workpiece 520, while rotating in the direction of arrow 510 relative to workpiece 520. The operation of cutter 508 may be performed such that levels of engagement of cutter 508 with respect to workpiece 520 occur within a desired level of engagement.

Figure 6:
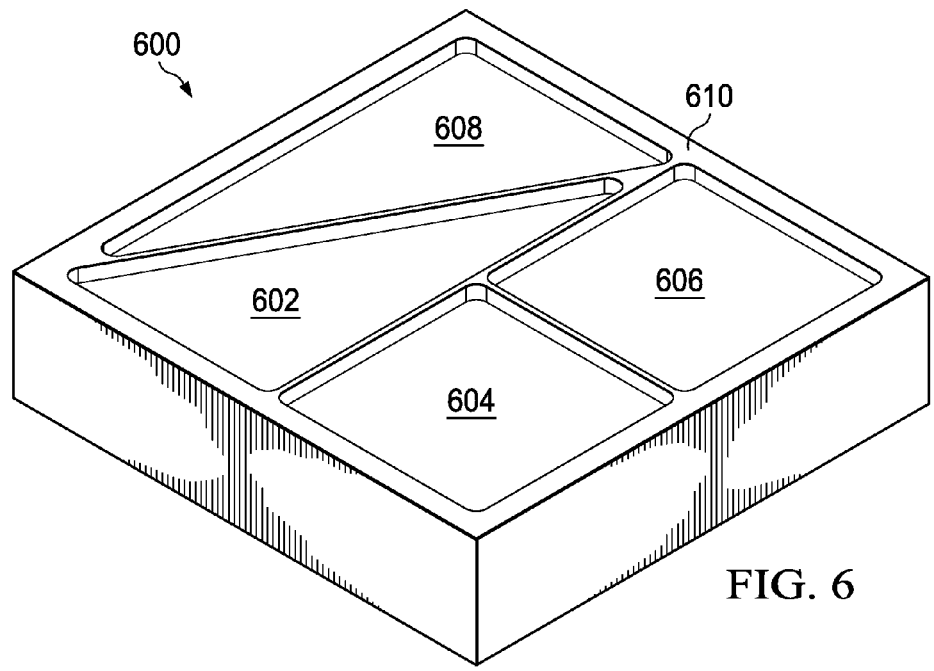
FIG. 6 is an illustration of a perspective view of a part machined from a workpiece in accordance with an advantageous embodiment.

Turning to FIG. 6, a perspective view of a part machined from a workpiece is depicted in accordance with an advantageous embodiment. In this illustrative example, part 600 may be a part resulting from performing machining operations on workpiece 520 in FIG. 5. As depicted, pocket 602, pocket 604, pocket 606, and pocket 608 may have been formed on top side 610 of workpiece 520 to form part 600. These pockets may be cavities formed in workpiece 520 by removing material from workpiece 520 in FIG. 5.

Figure 7:
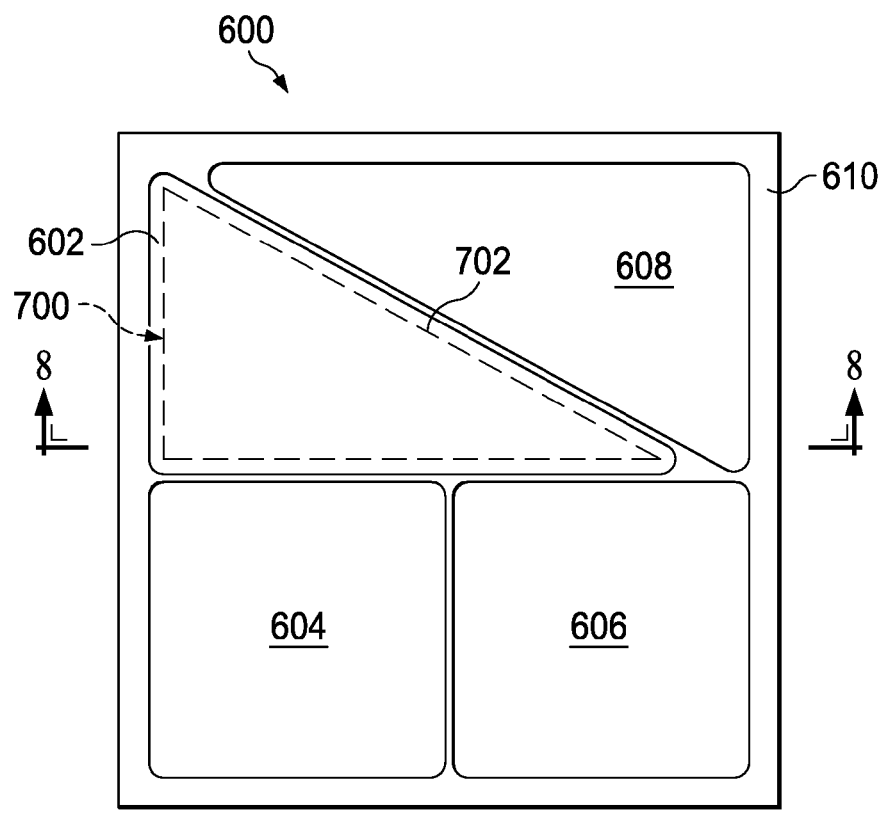
FIG. 7 is an illustration of a view of a top side of a part in accordance with an advantageous embodiment.

With reference now to FIG. 7, a view of a top side of a part is depicted in accordance with an advantageous embodiment. In this illustrative example, tool path 700 is depicted for pocket 602 on top side 610 on part 600. Tool path 700 may be generated by tool path generation module 350 in FIG. 3 and used by milling machine 502 to form pocket 602.

Boundary 702 may be a boundary for pocket 602 in this illustrative example. Tool path 700 may have boundary 702. Boundary 702 may be a portion of the tool path (not shown) used to machine part 600.

Pocket 604, pocket 606, and pocket 608 may be formed using tool paths (not shown) similar to tool path 700.

Figure 8:
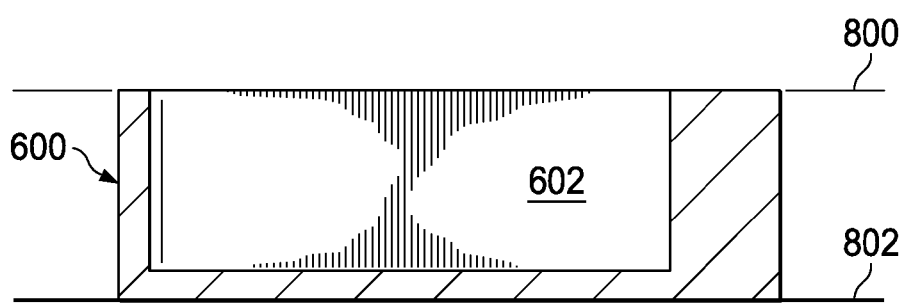
FIG. 8 is an illustration of a cross-sectional side view of a part in accordance with an advantageous embodiment.

Turning next to FIG. 8, a cross-sectional side view of a part is depicted in accordance with an advantageous embodiment. In this illustrative example, part 600 is shown from a cross-sectional side view taken along lines 8-8 in FIG. 7. In this illustrative example, plane 800 forms a top plane for pocket 602, while plane 802 forms a base plane for pocket 602.

Figure 9:
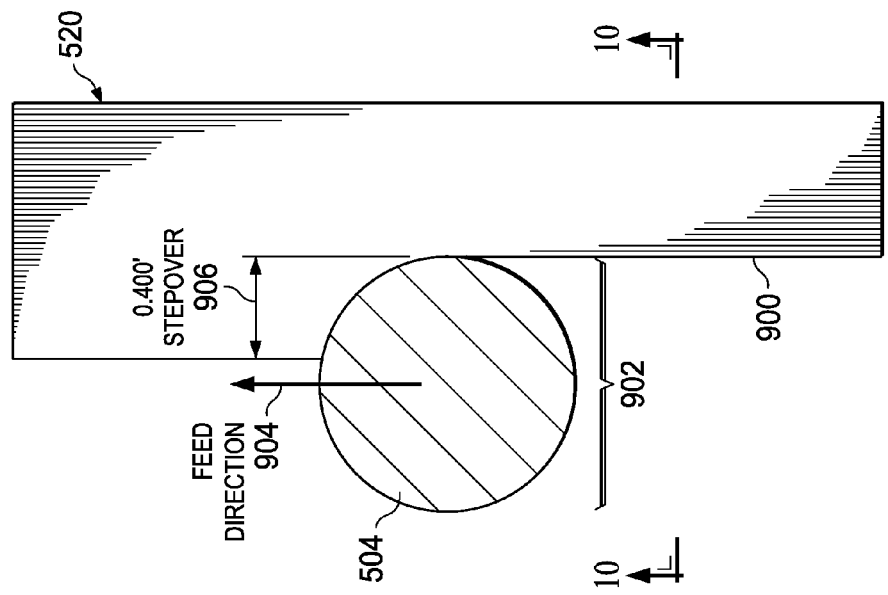
FIG. 9 is an illustration of radial engagement by a tool in accordance with an advantageous embodiment.

With reference now to FIG. 9, an illustration of radial engagement by a tool is depicted in accordance with an advantageous embodiment. In this illustrative example, a top cross-sectional view of tool 504 is illustrated while engaged with portion 900 of workpiece 520.

In this illustrative example, tool 504 may have diameter 902. Tool 504 may be moved in direction 904 for a tool path. Direction 904 may be a feed direction for tool 504. In this illustrative example, step over 906 may be about 0.400 inches. With step over 906, the radial engagement for tool 504 may be about 0.400 inches. This type of engagement may be a radial depth of cut.

Figure 10:
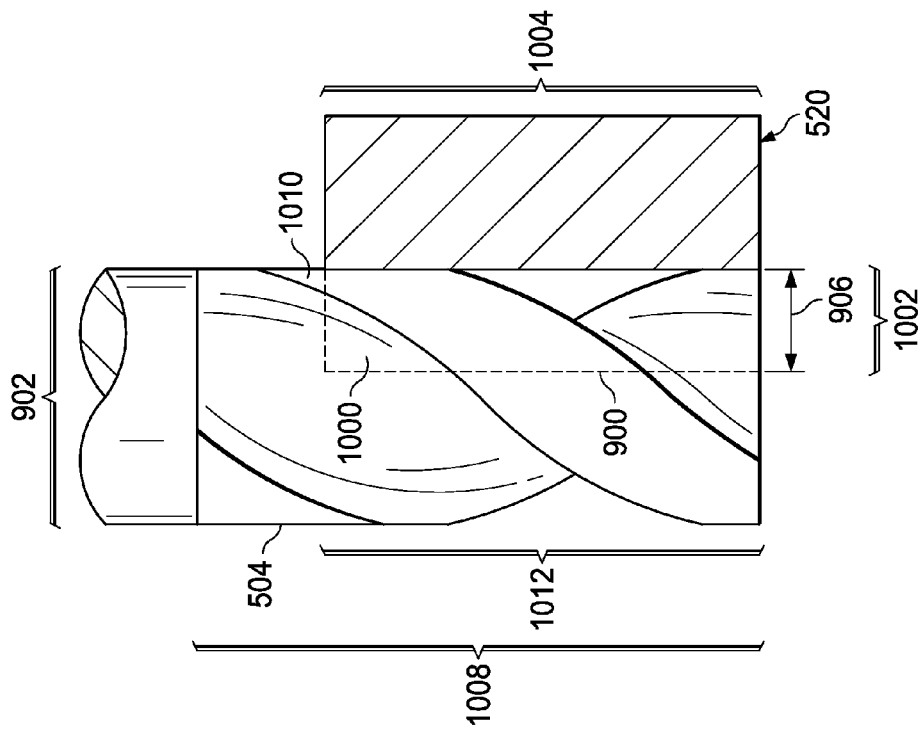
FIG. 10 is an illustration of a cross-sectional side view of a tool engaging a workpiece in accordance with an advantageous embodiment.

With reference now to FIG. 10, an illustration of a cross-sectional side view of a tool engaging a workpiece is depicted in accordance with an advantageous embodiment. In this illustrative example, a cross-sectional side view of tool 504 engaged with workpiece 520 is depicted in accordance with an advantageous embodiment.

In this illustration, section 1000 may depict radial engagement 1002 of tool 504 with workpiece 520. In this illustrative example, axial engagement 1004 also may be seen. Radial engagement 1002 may be about 0.400 inches.

In this illustrative example, tool 504 may have length 1008. Length 1008 may represent a length of cutting surface 1010 on tool 504. In this illustrative example, portion 1012 of length 1008 may engage workpiece 520. Portion 1012 of length 1008 may represent axial engagement 1004 in this illustrative example. Axial engagement 1004 may be about one inch in this depicted example.

With reference now to FIG. 11, an illustration of a radial engagement by a tool is depicted in accordance with an advantageous embodiment. In this illustrative example, a top cross-sectional view of tool 504 is illustrated while engaged with portion 1100 of workpiece 520.

In this illustrative example, tool 504 may be moved in direction 1102 for a tool path to cut concave curve 1104 into portion 1100 of workpiece 520. Direction 1102 may be a feed direction for tool 504. Concave curve 1104 may have radius 1108 of about 1.5 inches in this depicted example.

Further, step over 1106 may be about 0.400 inches in this depicted example. The radial engagement for tool 504 may depend on radius 1108 of concave curve 1104, the drive curve, and step over 1106. The drive curve is the curve followed by tool 504. In this illustrative example, the radial engagement for tool 504 may be greater than step over 1106. The radial engagement may be about 0.520 inches. This radial engagement may be a radial depth of cut.

Figure 12:
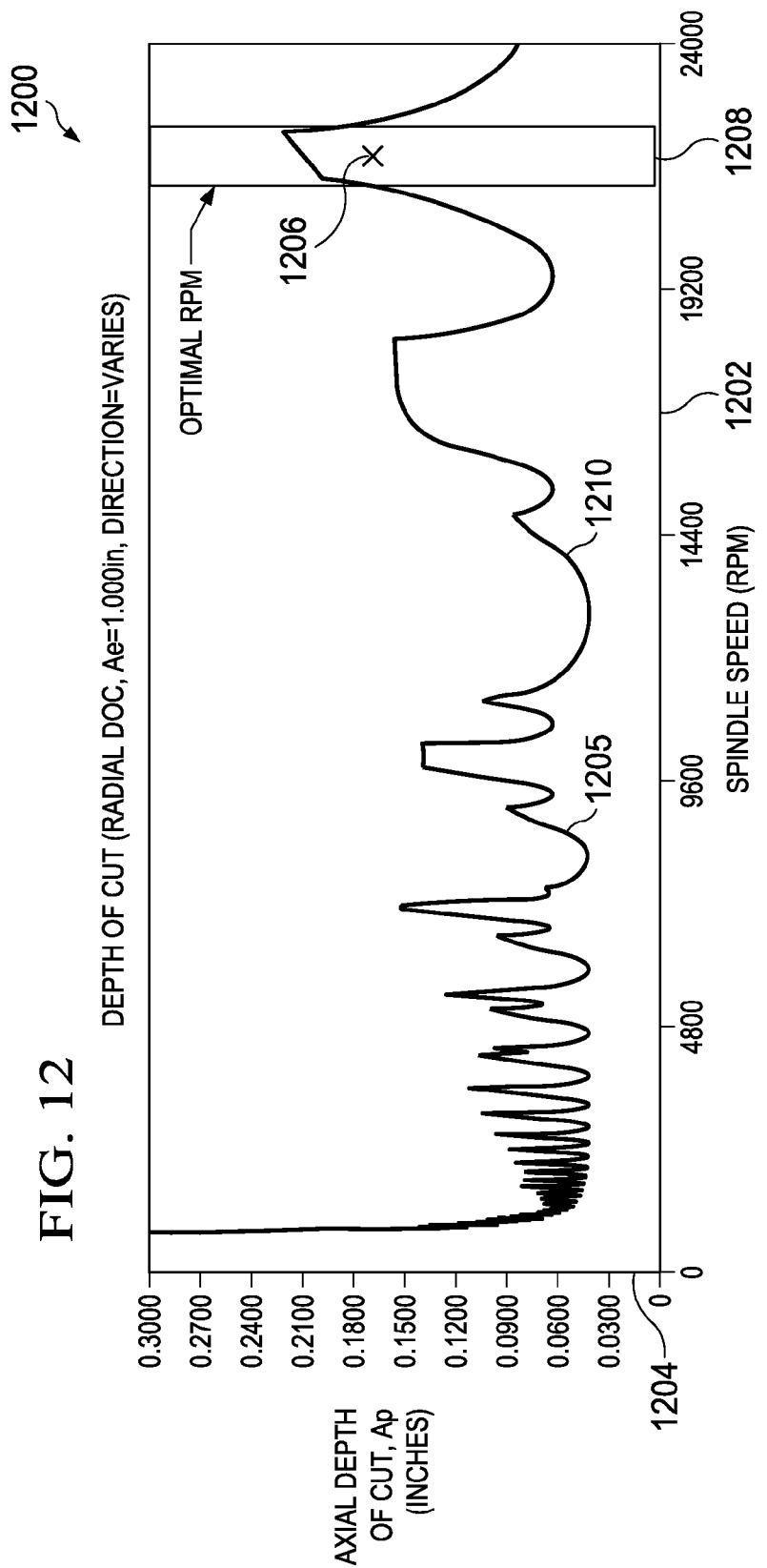
FIG. 12 is an illustration of a stability plot in accordance with an advantageous embodiment.

With reference now to FIG. 12, an illustration of a stability plot is depicted in accordance with an advantageous embodiment. In this illustrative example, stability plot 1200 is an example of one manner in which stability plot 414 may be presented. As illustrated, X axis 1202 may represent a spindle speed in revolutions per minute. Y axis 1204 may represent axial engagement in the form of axial depth of cut.

Line 1205 in stability plot 1200 may identify a maximum axial depth of cut for different speeds at which a tool may be rotated. As depicted, a desired axial engagement may be at point 1206 for a speed of rotation at point 1208.

In this illustrative example, stability plot 1200 may identify stability lobes 1210. Stability lobes 1210 may be identified using modal parameters 404 in FIG. 4 for tool 312 in FIG. 3 and a mathematical machining model to define limits of engagement that allow for machining without undesired inconsistencies or with a reduced number of undesired inconsistencies in workpiece 308.

Figures 13, 14:
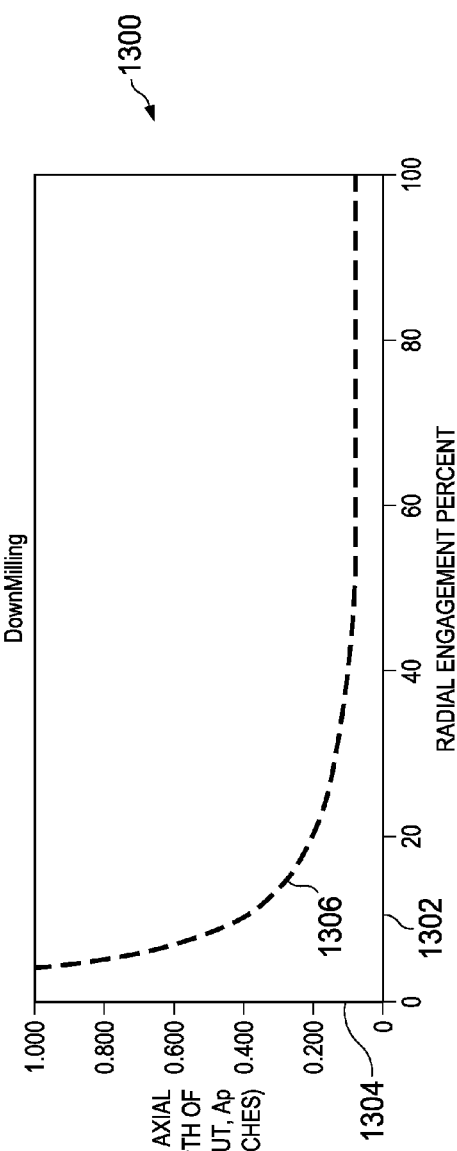
FIG. 13 is an illustration of an engagement plot in accordance with an advantageous embodiment.
FIG. 14 is an illustration of tool path data in accordance with an advantageous embodiment.

With reference now to FIG. 13, an illustration of an engagement plot is depicted in accordance with an advantageous embodiment. In this illustrative example, engagement plot 1300 is an example of one manner in which engagement plot 426 in FIG. 4 may be presented.

As illustrated, engagement plot 1300 has X axis 1302 which may represent a percentage of radial engagement. This percentage may be the percentage of the radial engagement of tool 312 in FIG. 3. Y axis 1304 may illustrate an axial engagement. In this example, the axial engagement may be an axial depth of cut.

Line 1306 may provide the identification of stability for different levels of axial engagement as a function of the percentage of radial engagement. It may be desirable to have the axial depth of cut selected such that the intersection of those two values in engagement plot 1300 is under line 1306. In a similar fashion, for the selection of any axial depth of cut, it may be desirable to have the percentage of radial engagement selected such that the intersection of the two values in engagement plot 1300 is below line 1306.

With line 1306, a maximum axial engagement may be identified for any percentage of radial engagement. In a similar fashion, a maximum percentage of radial engagement may be identified for different axial engagements.

In particular, a maximum level of axial engagement may be identified that is not greater than the maximum cutting depth of tool 312 and/or the depth of workpiece 308. When the maximum level of axial engagement is identified, desired levels of radial engagement may be identified using engagement plot 1300.

In this manner, engagement plot 1300 may be used to identify desired level of engagement 344 for tool 312 in FIG. 3. Desired level of engagement 344 may be axial engagement 326, radial engagement 328, or both.

When desired level of engagement 344 is identified using engagement plot 1300, levels of engagement 342 may be identified based on desired level of engagement 344. In some cases, a level of engagement in levels of engagement 342 may be less than desired level of engagement 344, depending on other factors taken into account in generating tool path 320.

The illustration of stability plot 1200 in FIG. 12 and engagement plot 1300 in FIG. 1300 are only examples of one manner in which these types of plots may be displayed. For example, without limitation, in other illustrative examples, the axial depth of cut may be placed on the X axis, while the radial depth of cut may be placed on the Y axis in engagement plot 1300.

In FIG. 14, an illustration of tool path data is depicted in accordance with an advantageous embodiment. In this illustrative example, table 1400 illustrates an example of some parameters that may be present in tool path data 402 in FIG. 4.

In this illustrative example, table 1400 may include description 1402, material code 1404, tool extension 1406, set length 1408, tool holder 1410, parameters 1412, and/or other suitable parameters. Entry 1414 may be an example of tool path data 402 or a particular tool and machine.

Description 1402 may describe the tool. Material code 1404 may identify the material of the tool. Tool extension 1406 may be the length that protrudes from the tool holder that is holding the tool. Set length 1408 may be the sum of the length of the tool holder and tool extension 1406. In other words, set length 1408 may be the length from the face of the spindle to the tip of the tool.

Tool holder 1410 may identify the type of holder on the machine that holds the tool. Parameters 1412 may comprise a rotational speed, a tool movement speed, and a maximum depth of cut for the particular tool.

Figure 15:
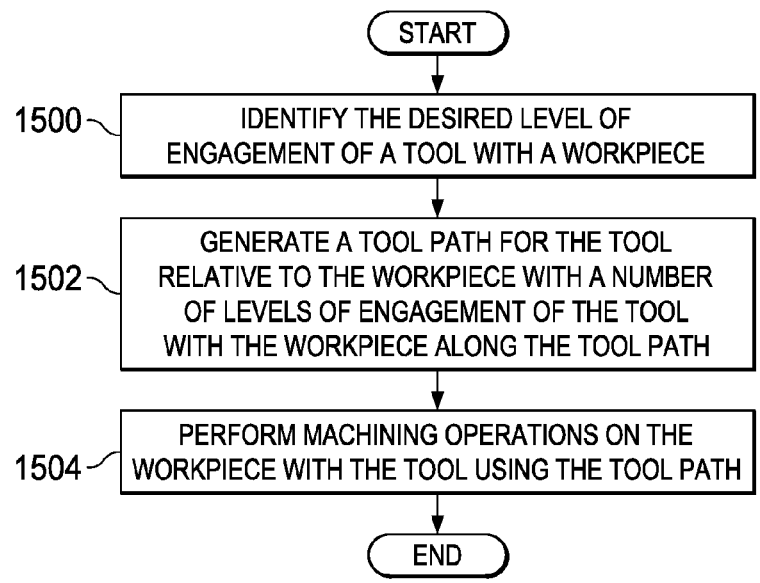
FIG. 15 is an illustration of a flowchart of a process for managing machining operations in accordance with an advantageous embodiment.

With reference now to FIG. 15, an illustration of a flowchart of a process for managing machining operations is depicted in accordance with an advantageous embodiment. The process illustrated in FIG. 15 may be implemented in manufacturing environment 300 in FIG. 3. This process may be implemented to perform machining operations 306 using machine 304 to form part 302 from workpiece 308.

The process may begin by identifying desired level of engagement 344 of tool 312 with workpiece 308 (operation 1500). Desired level of engagement 344 may be identified using engagement plot 1300 in FIG. 13.

The process may then generate tool path 320 for tool 312 relative to workpiece 308 with a number of levels of engagement 342 of tool 312 with workpiece 308 along tool path 320 (operation 1502). The number of levels of engagement 342 of tool 312 with workpiece 308 along tool path 320 may be based on desired level of engagement 344.

The process may perform machining operations 306 on workpiece 308 with tool 312 using tool path 320 (operation 1504), with the process terminating thereafter.

Figure 16:
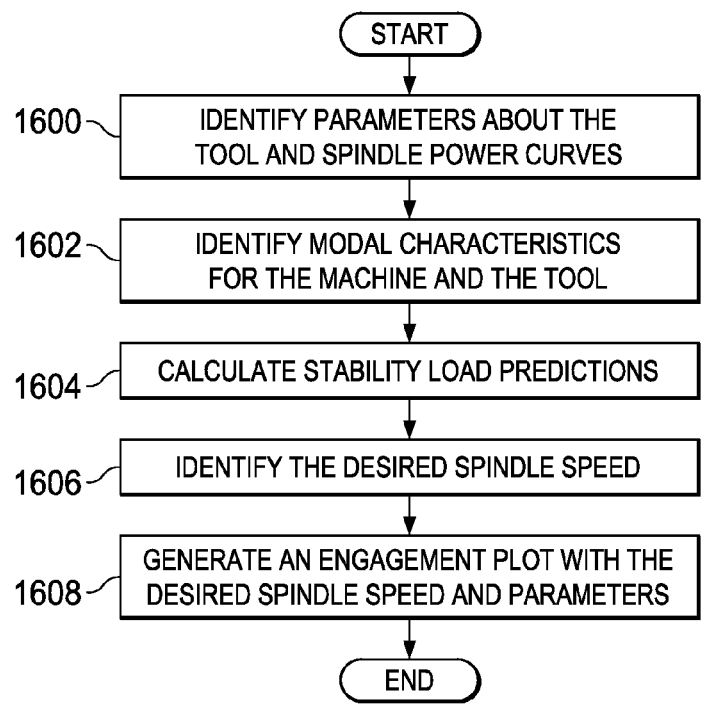
FIG. 16 is an illustration of a flowchart of a process for information used to identify a desired level of engagement in accordance with an advantageous embodiment.

With reference now to FIG. 16, an illustration of a flowchart of a process for information used to identify a desired level of engagement is depicted in accordance with an advantageous embodiment. The process illustrated in FIG. 16 may be implemented using tool path generation module 350 in FIGS. 3 and 4.

The process may begin by identifying parameters about tool 312 and spindle power curves (operation 1600). Spindle power curves may be identified by defining points, such as spindle revolutions per minute (rpm) and power and by creating lines between these points to identify the spindle power curves. The spindle power curves may be used as a constraint on the machining parameters, such as, for example, without limitation, federate and/or other suitable parameters.

The process may then identify modal characteristics for machine 304 and tool 312 (operation 1602). The characteristics may be identified in a number of different ways. For example, without limitation, these characteristics may be identified through testing. For example, without limitation, tool 312, when connected to machine 304, may be tapped, and vibrations from the tapping may be measured.

The tapping may be performed using a hammer that is calibrated and connected to the system collecting data. The measurements of the vibrations may be made and recorded through an accelerometer attached to tool 312. In this manner, the data that is collected may capture the input force and the time delay in the vibrations measured from the accelerometer.

From this data, a frequency response function may be used to identify parameters 400. Parameters 400 may be used to calculate a depth of cut that may be used with the tool. These parameters may be specific to tool 312 and machine 304.

The process may calculate stability load predictions (operation 1604). Stability load predictions may be calculated, and a plot, such as stability plot 414 in FIG. 4, may be made. Stability plot 1200 in FIG. 12 is an example of one manner in which stability plot 414 in FIG. 4 may be depicted. The process may identify desired spindle speed 442 (operation 1606). This spindle speed may be identified using the information in stability plot 414 in FIG. 4. With desired spindle speed 442 and parameters 400, engagement plot 426 may be generated (operation 1608), with the process terminating thereafter. Engagement plot 1300 in FIG. 13 is an example of an implementation of engagement plot 426 shown in block form in FIG. 4.

With reference now to FIG. 17, an illustration of a flowchart of a process for generating a tool path is depicted in accordance with an advantageous embodiment. In this illustrative example, the process may generate tool path 320 in FIG. 3 for performing machining operations 306 on workpiece 308 using tool 312 on machine 304.

The process may begin by defining a maximum axial depth of cut and a maximum radial depth of cut that may occur based on tool 312 (operation 1700). Engagement plot 426 may be used to define the maximum axial depth of cut and the maximum radial depth of cut.

In this illustrative example, the maximum axial depth of cut may be defined by a flute length of tool 312 and/or a depth of cavity 435 formed using tool 312. The maximum radial depth of cut may be defined using engagement plot 426 when the axial depth of cut is already defined.

The process may then define the geometry for the feature (operation 1702). The geometry for the feature may include a first plane and a second plane. The first plane and the second plane may be substantially parallel to each other and may define a boundary for the feature. Additionally, other boundaries may be defined. These other boundaries may include, for example, without limitation, a width, a length, a radius, and other suitable parameters that may identify the boundaries of the feature. In this manner, the geometry may include a number of dimensions for the feature.

A determination may be made as to whether the depth of the pocket is greater than length 336 of cutting surface 324 on tool 312 (operation 1704). If the depth of the pocket is greater than length 336 of cutting surface 324 on tool 312, the process may identify the number of axial passes (operation 1706). Each axial pass may be on a different level or cut level. In other words, each axial pass may result in tool 312 cutting further into workpiece 308.

In some illustrative examples, in operation 1704, the determination may be made as to whether the depth of the pocket is greater than desired axial engagement 422 for tool 312 instead of greater than length 336 of cutting surface 324 on tool 312. In this illustrative example, desired axial engagement 422 may be a desired axial depth of cut for tool 312.

In these examples, without limitation, the number of axial passes may be found using the equation below. In this example, the integer, N, may be the number of axial passes and may be defined according to the equation:

$$\frac{PD}{N} = ADOC \leq L$$

where PD may be the pocket depth, N may be the integer for the number of axial passes, ADOC may be the maximum axial depth of cut, and L may be the length of cutting surface 324 on tool 312.

The process may then define the maximum axial depth of cut based on the number of axial passes (operation 1708). The pocket depth may be divided by the integer, N, to calculate maximum axial depth of cut as shown in the following equation:

$$ADOC = \frac{PD}{N}$$

where ADOC may be the maximum axial depth of cut, PD may be the pocket depth, and N may be the integer for number of axial passes. The number of axial passes having the maximum axial depth of cut may be the number of levels of engagement 342.

With reference again to operation 1704, if the depth of the pocket is less than length 336 of cutting surface 324 on tool 312, the process may set the maximum axial depth of cut equal to the pocket depth (operation 1710).

The process may then determine the maximum radial depth of cut for the cutting conditions using engagement plot 426 and the maximum axial depth of cut (operation 1712). A substantially constant maximum radial depth of cut may be desired level of engagement 342. A determination may be made as to whether the maximum radial depth of cut is greater than half of diameter 340 of tool 312 (operation 1714). If the maximum radial depth of cut is greater than half of diameter 340 of tool 312, the process may then calculate the feed rate of tool 312 using the maximum chip thickness (operation 1716). The feed rate of tool 312 may be calculated according to the equation:

$$IPM = RPM * MCT * T$$

where IPM may be the feed rate in inches per minute, RPM may be the revolutions per minute, MCT may be the maximum chip thickness, and T may be the number of teeth on tool 312. The chip thickness may be an amount of material 314 that may be removed by tool 312 when engaged with workpiece 308.

With reference again to operation 1714, if the maximum radial depth of cut is less than half of diameter 340 of tool 312, the process may calculate the feed rate of tool 312 using the inches per tooth (operation 1718). The feed rate of tool 312 calculated in inches per minute in this example is shown in the equation:

$$IPM = RPM * IPT * T$$

where IPM may be the feed rate in inches per minute, RPM may be the revolutions per minute, IPT may be the inches per tooth, and T may be the number of teeth on tool 312.

The inches per tooth of the cutting tool used in the calculation for the feed rate of tool 312 may be used to adjust the chip thickness when the maximum radial depth of cut is less than half of diameter 340 of tool 312 and is defined by the equation:

$$IPT = \frac{\frac{0.5\,D}{RDOC}}{\sqrt{\left(\frac{D}{RDOC}\right) - 1}} \cdot MCT$$

where IPT may be the inches per tooth, D may be the diameter of tool 312, RDOC may be the maximum radial depth of cut, and MCT may be the maximum chip thickness.

The example calculations shown in these equations use machining parameters that define features of tool 312 and/or workpiece 308. These machining parameters may be, for example, without limitation, parameters 400 used to generate tool path data 402 in FIG. 4. The machining parameters may be, for example, without limitation, the pocket depth, the integer for the number of axial passes, the maximum axial depth of cut, the length of cutting surface 324 on tool 312, the feed rate in inches per minute, the speed of rotation in revolutions per minute, the maximum chip thickness, the number of teeth on tool 312, the inches per tooth, and the diameter of tool 312 may be modal parameters 404, machining parameters 406, tool parameters 408, material parameters 410, and/or other suitable types of parameters for use in generating tool path data 402 in FIG. 4.

The process may then determine whether the machining parameters are within the safe operating conditions (operation 1720). The machining parameters may be compared to the safe operating conditions by the machining parameters and comparing the product and the power of the machine with the incorporated factor of safety. For example, without limitation, the parameters may include feed rate, radial depth of cut, axial depth of cut, and/or the material constant.

The following equation may be one example of determining whether the parameters are within the safe operating conditions:

$$IPM * RDOC * ADOC * K > S * P$$

where IPM may be the feed rate in inches per minute, RDOC may be the maximum radial depth of cut, ADOC may be the maximum axial depth of cut, K may be the material constant, S may be the safety factor, and P may be the power.

In this illustrative example, the power, P, may be the power that is available based on the revolutions per minute being used for the tool. This power may be defined using spindle power curves. The material constant, K, may be a factor that is used to convert a unit of power to the amount of material being removed from the workpiece as a function of time. This material constant may be identified using, for example, without limitation, a handbook.

If the parameters are within the safe operating conditions, the process may generate tool path 320 that provides desired level of engagement 342 using the maximum axial depth of cut, the maximum radial depth of cut, and the feed rate (operation 1722), with the process terminating thereafter. In particular, in operation 1722, tool path 320 may be generated such that the maximum radial depth of cut for each of the number of axial passes made having the maximum axial depth of cut at the feed rate during machining operations 306 may remain substantially constant.

In this manner, tool path 320 with number of levels of engagement 344 may provide desired level of engagement 342. Further, tool path 320 generated in operation 1722 may reduce the number of inconsistencies on surface 348 of workpiece 308 that are out-of-tolerance to desired number of inconsistencies 346 that are out-of tolerance. In this illustrative example, the desired number of out-of-tolerance inconsistencies may be about zero.

With reference again to operation 1720, if the machining parameters are not within the safe operating conditions, the process may adjust the feed rate according to the factor of safety (operation 1724). After operation 1724, the process may proceed to operation 1722 as described above.

The process may adjust the feed rate in this example according to the following equation:

$$IPM = \frac{S \cdot P}{ADOC \cdot RDOC \cdot K}$$

where IPM may be the feed rate in inches per minute, S may be the safety factor, P may be the power, ADOC may be the maximum axial depth of cut, RDOC may be the maximum radial depth of cut, and K may be the material constant. The safety factor, S, may be at the discretion of the operator using tool 312 to perform the machining operations.

The flowcharts and block diagrams in the different depicted embodiments illustrate the architecture, functionality, and operation of some possible implementations of apparatuses, methods, and computer program products. In this regard, each block in the flowcharts or block diagrams may represent a module, segment, or portion of computer usable or readable program code, which comprises one or more executable instructions for implementing the specified function or functions. In some alternative implementations, the function or functions noted in the block may occur out of the order noted in the figures. For example, without limitation, in some cases, two blocks shown in succession may be executed substantially concurrently, or the blocks may sometimes be executed in the reverse order, depending upon the functionality involved.

Turning now to FIG. 18, an illustration of a data processing system is depicted in accordance with an advantageous embodiment. In this illustrative example, data processing system 1800 may include communications fabric 1802, which may provide communications between processor unit 1804, memory 1806, persistent storage 1808, communications unit 1810, input/output (I/O) unit 1812, and display 1814. Data processing system 1800 may be an example of a data processing system that may be used to implement one or more computers or devices in computer system 316 in FIG. 3.

Processor unit 1804 serves to execute instructions for software that may be loaded into memory 1806. Processor unit 1804 may be a number of processors, a multi-processor core, or some other type of processor, depending on the particular implementation. A number, as used herein with reference to an item, means one or more items. Further, processor unit 1804 may be implemented using a number of heterogeneous processor systems in which a main processor may be present with secondary processors on a single chip. As another illustrative example, processor unit 1804 may be a symmetric multi-processor system containing multiple processors of the same type.

Memory 1806 and persistent storage 1808 may be examples of storage devices 1816. A storage device may be any piece of hardware that is capable of storing information, such as, for example, without limitation, data, program code in functional form, and/or other suitable information either on a temporary basis and/or a permanent basis. Storage devices 1816 may also be referred to as computer readable storage devices in these examples. Memory 1806, in these examples, may be, for example, without limitation, a random access memory or any other suitable volatile or non-volatile storage device. Persistent storage 1808 may take various forms, depending on the particular implementation.

For example, without limitation, persistent storage 1808 may contain one or more components or devices. For example, without limitation, persistent storage 1808 may be a hard drive, a flash memory, a rewritable optical disk, a rewritable magnetic tape, or some combination of the above. The media used by persistent storage 1808 also may be removable. For example, without limitation, a removable hard drive may be used for persistent storage 1808.

Communications unit 1810, in these examples, may provide for communications with other data processing systems or devices. In these examples, communications unit 1810 may be a network interface card. Communications unit 1810 may provide communications through the use of either or both physical and wireless communications links.

Input/output unit 1812 may allow for input and output of data with other devices that may be connected to data processing system 1800. For example, without limitation, input/output unit 1812 may provide a connection for user input through a keyboard, a mouse, and/or some other suitable input device. Further, input/output unit 1812 may send output to a printer. Display 1814 may provide a mechanism to display information to a user.

Instructions for the operating system, applications, and/or programs may be located in storage devices 1816, which are in communication with processor unit 1804 through communications fabric 1802. In these illustrative examples, the instructions may be in a functional form on persistent storage 1808. These instructions may be loaded into memory 1806 for execution by processor unit 1804. The processes of the different embodiments may be performed by processor unit 1804 using computer-implemented instructions, which may be located in a memory, such as memory 1806.

These instructions are referred to as program code, computer usable program code, or computer readable program code that may be read and executed by a processor in processor unit 1804. The program code in the different embodiments may be embodied on different physical or computer readable storage media, such as memory 1806 or persistent storage 1808.

Program code 1818 may be located in a functional form on computer readable media 1820 that is selectively removable and may be loaded onto or transferred to data processing system 1800 for execution by processor unit 1804. Program code 1818 and computer readable media 1820 may form computer program product 1822 in these examples. In one example, computer readable media 1820 may be computer readable storage media 1824 or computer readable signal media 1826. Computer readable storage media 1824 may include, for example, without limitation, an optical or magnetic disk that may be inserted or placed into a drive or other device that may be part of persistent storage 1808 for transfer onto a storage device, such as a hard drive, that is part of persistent storage 1808. Computer readable storage media 1824 also may take the form of a persistent storage, such as a hard drive, a thumb drive, or a flash memory, that is connected to data processing system 1800. In some instances, computer readable storage media 1824 may not be removable from data processing system 1800. In these examples, computer readable storage media 1824 may be a physical or tangible storage device used to store program code 1818 rather than a medium that propagates or transmits program code 1818. Computer readable storage media 1824 may also be referred to as a computer readable tangible storage device or a computer readable physical storage device. In other words, computer readable storage media 1824 may be a media that can be touched by a person.

Alternatively, program code 1818 may be transferred to data processing system 1800 using computer readable signal media 1826. Computer readable signal media 1826 may be, for example, without limitation, a propagated data signal containing program code 1818. For example, without limitation, computer readable signal media 1826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1818 may be downloaded over a network to persistent storage 1808 from another device or data processing system through computer readable signal media 1826 for use within data processing system 1800. For instance, program code stored in a computer readable storage medium in a server data processing system may be downloaded over a network from the server to data processing system 1800. The data processing system providing program code 1818 may be a server computer, a client computer, or some other device capable of storing and transmitting program code 1818.

The different components illustrated for data processing system 1800 are not meant to provide architectural limitations to the manner in which different embodiments may be implemented. The different advantageous embodiments may be implemented in a data processing system including components in addition to or in place of those illustrated for data processing system 1800. Other components shown in FIG. 18 may be varied from the illustrative examples shown. The different embodiments may be implemented using any hardware device or system capable of running program code. As one example, the data processing system may include organic components integrated with inorganic components and/or may be comprised entirely of organic components excluding a human being. For example, without limitation, a storage device may be comprised of an organic semiconductor.

In another illustrative example, processor unit 1804 may take the form of a hardware unit that has circuits that are manufactured or configured for a particular use. This type of hardware may perform operations without needing program code to be loaded into a memory from a storage device to be configured to perform the operations.

For example, without limitation, when processor unit 1804 takes the form of a hardware unit, processor unit 1804 may be a circuit system, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices may include, for example, without limitation, a programmable logic array, a programmable array logic, a field programmable logic array, a field programmable gate array, and other suitable hardware devices. With this type of implementation, program code 1818 may be omitted, because the processes for the different embodiments are implemented in a hardware unit.

In still another illustrative example, processor unit 1804 may be implemented using a combination of processors found in computers and hardware units. Processor unit 1804 may have a number of hardware units and a number of processors that are configured to run program code 1818. With this depicted example, some of the processes may be implemented in the number of hardware units, while other processes may be implemented in the number of processors.

In another example, a bus system may be used to implement communications fabric 1802 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, without limitation, memory 1806, or a cache, such as found in an interface and memory controller hub that may be present in communications fabric 1802.

Thus, the different advantageous embodiments provide a method and apparatus for managing machining operations. With the different advantageous embodiments, tool paths may be generated in a manner that reduces the time needed to manufacture parts from workpieces. The amount of time needed to manufacture a part may be reduced through increasing engagement 322 of tool 312 when performing machining operations 306 on workpiece 308. Engagement 322 may be such that a number of levels of engagement 342 may be selected to be within desired level of engagement 344.

The description of the different advantageous embodiments has been presented for purposes of illustration and description and is not intended to be exhaustive or limited to the embodiments in the form disclosed. Many modifications and variations may be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for managing machining operations, the method comprising:
    identifying with a processor unit a desired level of engagement of a tool with a workpiece using an engagement plot of an axial depth of cut versus a radial depth of cut; and
    generating, using the processor unit, a tool path for the tool relative to the workpiece in which the tool path has a number of levels of engagement of the tool with the workpiece along the tool path and in which the number of levels of engagement of the tool with the workpiece along the tool path is based on the desired level of engagement.

2. The computer-implemented method of claim 1, wherein operating the tool using the tool path with the number of levels of engagement reduces a number of inconsistencies that are out-of-tolerance on a surface of the workpiece to a desired number of inconsistencies that are out-of-tolerance after the machining operations are completed.

3. The computer-implemented method of claim 1 further comprising:
    performing the machining operations on the workpiece with the tool using the tool path.

4. The computer-implemented method of claim 1, wherein the desired level of engagement is defined by the engagement plot, wherein the engagement plot shows stability between the axial depth of cut and the radial depth of cut for the tool used with a particular machine at a selected speed of rotation for the tool.

5. The computer-implemented method of claim 1, wherein identifying the desired level of engagement of the tool with the workpiece comprises:
   identifying the desired level of engagement for the tool with the workpiece when the tool is used on a particular machine to perform the machining operations on the workpiece.

6. The computer-implemented method of claim 1, wherein the desired level of engagement is a substantially constant radial depth of cut and the number of levels of engagement is a number of axial passes at a maximum axial depth of cut and wherein operating the tool using the tool path with the number of axial passes substantially maintains the substantially constant radial depth of cut for each of the number of axial passes during the machining operations.

7. The computer-implemented method of claim 1, wherein the generating step comprises:
   identifying dimensions using the processor unit for a number of features to be formed;
   identifying with the processor unit at least one of another axial depth of cut, another radial depth of cut, and a feed rate based on the dimensions of the number of features, wherein the another axial depth of cut and the another radial depth of cut are the desired level of engagement; and
   generating the tool path for the tool relative to the workpiece with the number of levels of engagement of the tool with the workpiece along the tool path based on the dimensions and the at least one of the another axial depth of cut, the another radial depth of cut, and the feed rate.

8. The computer-implemented method of claim 7, wherein a feature in the number of features is a pocket and the dimensions comprise at least one of a top plane, a base plane, and boundaries for the pocket.

9. The computer-implemented method of claim 8, wherein the pocket to be formed is a feature for a part and further comprising:
   identifying with the processor unit a desired axial depth of cut for the tool;
   identifying with the processor unit a number of axial passes for the pocket if a depth of the pocket is greater than the desired axial depth of cut for the tool; and
   identifying with the processor unit a desired radial depth of cut for the desired axial depth of cut, wherein the desired axial depth of cut and the desired radial depth of cut form the number of levels of engagement for the desired level of engagement.

10. The computer-implemented method of claim 9 further comprising:
   selecting the feed rate for the tool using a processor unit.

11. The computer-implemented method of claim 1, wherein the desired level of engagement is selected from at least one of another axial depth of cut and another radial depth of cut for a selected speed of rotation.

12. The computer-implemented method of claim 1, wherein the workpiece is comprised of a material selected from aluminum, titanium, steel, plastic, and wood.

13. The computer-implemented method of claim 1, further comprising:
   forming an aircraft part from the workpiece by performing machining operations on the workpiece with the tool.

14. A method for machining an aircraft part from a workpiece, the method comprising:
   identifying a desired level of engagement of a tool with a workpiece when the tool is used on a particular machine to perform machining operations on the workpiece using an engagement plot of an axial depth of cut versus a radial depth of cut for a selected speed of rotation for the tool on the particular machine in which the workpiece is comprised of a material selected from aluminum, titanium, steel, plastic, and wood;
   generating a tool path for the tool relative to the workpiece in which the tool path has a number of levels of engagement of the tool with the workpiece along the tool path and in which the number of levels of engagement of the tool with the workpiece along the tool path is based on the desired level of engagement wherein the desired level of engagement is defined by the engagement plot showing stability between the axial depth of cut and the radial depth of cut for the tool used with the particular machine at the selected speed of rotation for the tool in which a level of engagement in the number of levels of engagement is selected from at least one of the axial depth of cut and the radial depth of cut for the selected speed of rotation;
   selecting a feed rate for the tool; and
   performing the machining operations on the workpiece with the tool using the feed rate for the tool and the tool path in which operating the tool using the tool path with the number of levels of engagement reduces a number of inconsistencies that are out-of-tolerance on a surface of the workpiece to a desired number of inconsistencies that are out-of-tolerance after the machining operations are completed.

15. The method of claim 14, wherein the generating step comprises:
   identifying dimensions for a pocket to be formed in the workpiece in which the dimensions comprise at least one of a top plane, a base plane, and boundaries for the pocket;
   identifying at least one of the axial depth of cut, the radial depth of cut, the feed rate based on the dimensions for the pocket, wherein the axial depth of cut and the radial depth of cut are the desired level of engagement; and
   generating the tool path for the tool relative to the workpiece with the number of levels of engagement of the tool with the workpiece along the tool path based on the dimensions and the at least one of the axial depth of cut, the radial depth of cut, and the feed rate.

16. The method of claim 15, wherein the pocket is to be formed for a part and further comprising:
   identifying a desired axial depth of cut for the tool;
   identifying a number of axial passes for the pocket if a depth of the pocket is greater than the desired axial depth of cut for the tool; and
   identifying a desired radial depth of cut for the desired axial depth of cut, wherein the desired axial depth of cut and the desired radial depth of cut form the number of levels of engagement for the desired level of engagement.

17. A method for performing machining operations, the method comprising:
   identifying a desired level of engagement of a tool with a workpiece using an engagement plot of an axial depth of cut versus a radial depth of cut;
   selecting a tool path for forming a part from the workpiece; and
   performing the machining operations on the workpiece using the tool in which the tool moves on the tool path for the tool relative to the workpiece with a number of levels of engagement of the tool with the workpiece along the tool path in which the number of levels of engagement of the tool with the workpiece along the tool path is based on the desired level of engagement.

18. The method of claim 17, wherein the tool path with the number of levels of engagement reduces an amount of time used to perform the machining operations to form the part from the workpiece.

19. An apparatus comprising:
a computer system comprising a processor unit configured to: identify a desired level of engagement of a tool with a workpiece using an engagement plot of an axial depth of cut versus a radial depth of cut and generate a tool path for the tool relative to the workpiece in which the tool path has a number of levels of engagement of the tool with the workpiece along the tool path and in which the number of levels of engagement of the tool with the workpiece along the tool path is based on the desired level of engagement.

20. The apparatus of claim 19, wherein operating the tool using the tool path with the number of levels of engagement reduces a number of inconsistencies that are out-of-tolerance on a surface of the workpiece to a desired number of inconsistencies that are out-of-tolerance after machining operations are completed.

21. The apparatus of claim 20 further comprising:
a machine configured to perform the machining operations on the workpiece with the tool using the tool path.

22. The apparatus of claim 21, wherein the desired level of engagement is defined by the engagement plot, wherein the engagement plot shows stability between the axial depth of cut and the radial depth of cut for the tool used with the machine at a selected speed of rotation for the tool.

23. The apparatus of claim 19, wherein in being configured to identify the desired level of engagement of the tool with the workpiece, the computer system is configured to identify the desired level of engagement for the tool with the workpiece when the tool is used on a machine to perform machining operations on the workpiece.

24. The apparatus of claim 20, wherein the desired level of engagement is a substantially constant radial depth of cut and the number of levels of engagement is a number of axial passes at a maximum axial depth of cut and wherein operating the tool using the tool path with the number of axial passes substantially maintains the substantially constant radial depth of cut for each of the number of axial passes during the machining operations.

25. The apparatus of claim 19, wherein in being configured to generate the tool path, the computer system is configured to identify dimensions for a number of features to be formed; and
identifying at least one of another axial depth of cut, another radial depth of cut, and a feed rate based on the dimensions of the number of features, wherein the another axial depth of cut and the another radial depth of cut are the desired level of engagement and generating the tool path for the tool relative to the workpiece with the number of levels of engagement of the tool with the workpiece along the tool path based on the dimensions and the at least one of the another axial depth of cut, the another radial depth of cut, and the feed rate.

26. The apparatus of claim 25, wherein a feature in the number of features is a pocket and the dimensions comprise at least one of a top plane, a base plane, and boundaries for the pocket.

27. The apparatus of claim 26, wherein the pocket to be formed is a feature for a part and the computer system further being configured to identify a desired axial depth of cut for the tool; identify a number of axial passes for the pocket if a depth of the pocket is greater than the desired axial depth of cut for the tool; and identify a desired radial depth of cut for the desired axial depth of cut, wherein the desired axial depth of cut and the desired radial depth of cut form the number of levels of engagement for the desired level of engagement.

28. An apparatus comprising:
a machine; and
a tool connected to the machine, wherein the machine is configured to perform machining operations on a workpiece using a tool in which the tool moves on a tool path for the tool relative to the workpiece with a number of levels of engagement of the tool with the workpiece along the tool path in which the number of levels of engagement of the tool with the workpiece along the tool path is based on a desired level of engagement of the tool with the workpiece, wherein the desired level of engagement is identified using an engagement plot of an axial depth of cut versus a radial depth of cut.

29. The apparatus of claim 28, wherein operating the tool using the tool path with the number of levels of engagement reduces a number of inconsistencies that are out-of-tolerance on a surface of the workpiece to a desired number of inconsistencies that are out-of-tolerance after the machining operations are completed.

30. The apparatus of claim 28, wherein the desired level of engagement is defined by the engagement plot, wherein the engagement plot shows stability between the axial depth of cut and the radial depth of cut for the tool used with the machine at a selected speed of rotation for the tool.

31. The apparatus of claim 28, wherein the desired level of engagement is a substantially constant radial depth of cut and the number of levels of engagement is a number of axial passes at a maximum axial depth of cut and wherein operating the tool using the tool path with the number of axial passes substantially maintains the substantially constant radial depth of cut for each of the number of axial passes during the machining operations.

32. The apparatus of claim 28, wherein the desired level of engagement is selected from at least one of another axial depth of cut and another radial depth of cut for a selected speed of rotation.

33. A system for machining an aircraft part from a workpiece, the system comprising:
a computer system configured to identify a desired level of engagement of a tool with the workpiece when the tool is used on a particular machine to perform machining operations on the workpiece using an engagement plot of an axial depth of cut versus a radial depth of cut for a selected speed of rotation for the tool on the particular machine in which the workpiece is comprised of a material selected from aluminum, titanium, steel, plastic, and wood; generate a tool path for the tool relative to the workpiece in which the tool path has a number of levels of engagement of the tool with the workpiece along the tool path and in which the number of levels of engagement of the tool with the workpiece along the tool path is based on the desired level of engagement wherein the desired level of engagement is defined by the engagement plot showing stability between the axial depth of cut and the radial depth of cut for the tool used with the particular machine at the selected speed of rotation for the tool in which a level of engagement in the number of levels of engagement is selected from at least one of the axial depth of cut and the radial depth of cut for the selected speed of rotation; and select a feed rate for the tool; and
a machine with the tool in which the machine is configured to perform the machining operations on the workpiece with the tool using the feed rate for the tool and the tool path to form the aircraft part from the workpiece in which operating the tool using the tool path with the number of levels of engagement reduces a number of inconsistencies that are out-of-tolerance on a surface of the workpiece to a desired number of inconsistencies that are out-of-tolerance after the machining operations are completed.

* * * * *